(No Model.)  2 Sheets—Sheet 2.

A. B. OPPY.
ICE CREAM FREEZER.

No. 546,243. Patented Sept. 10, 1895.

Inventor
Abraham B. Oppy.

Witnesses
By his Attorneys.

UNITED STATES PATENT OFFICE.

ABRAHAM B. OPPY, OF PAYNE, OHIO.

ICE-CREAM FREEZER.

SPECIFICATION forming part of Letters Patent No. 546,243, dated September 10, 1895.

Application filed July 21, 1894. Serial No. 518,233. (No model.)

*To all whom it may concern:*

Be it known that I, ABRAHAM B. OPPY, a citizen of the United States, residing at Payne, in the county of Paulding and State of Ohio, have invented a new and useful Ice-Cream Freezer, of which the following is a specification.

This invention relates to ice-cream freezers; and it has for its object to effect certain improvements in freezing-machines of this character wherein simple and efficient means shall be provided for thoroughly and rapidly freezing cream or other substances.

To this end the main and primary object of the present invention is to construct an ice-cream freezer in a manner that will provide for a large distribution of ice, while at the same time insuring the quick and thorough freezing of the cream or other substance.

With these and other objects in view, which will readily appear as the nature of the invention is better understood, the same consists in the novel construction, combination, and arrangement of parts hereinafter more fully described, illustrated, and claimed.

Figure 1:
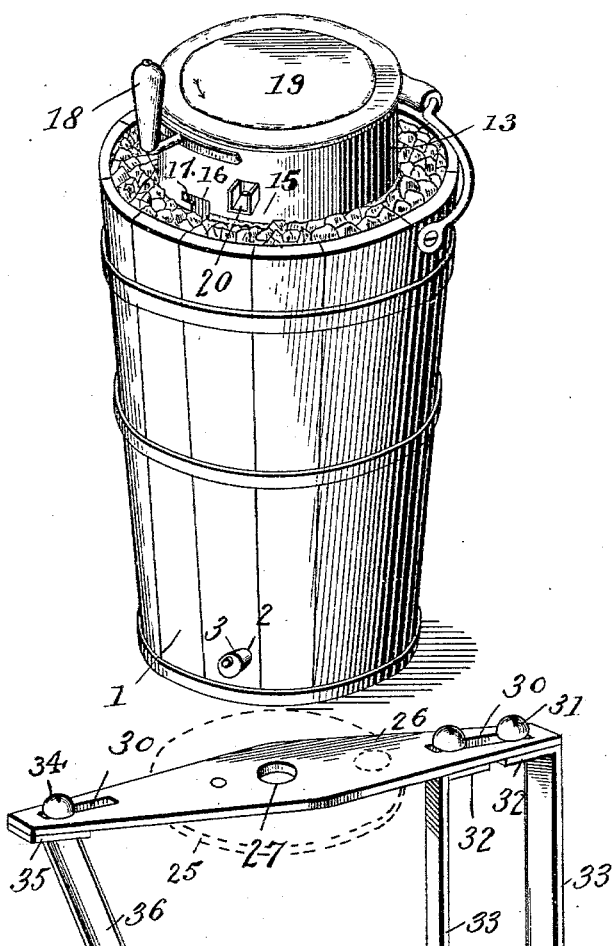
Figure 2:
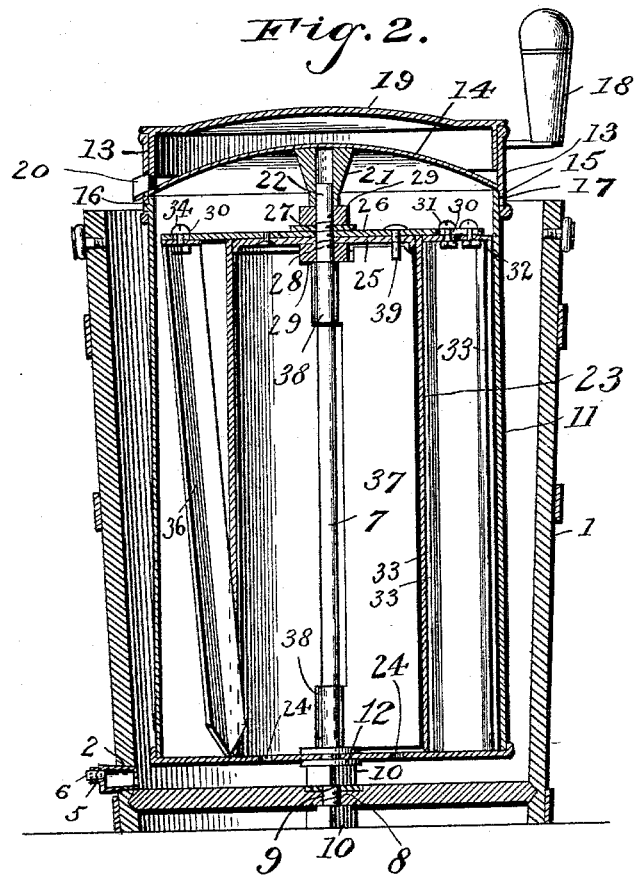
Figure 4:
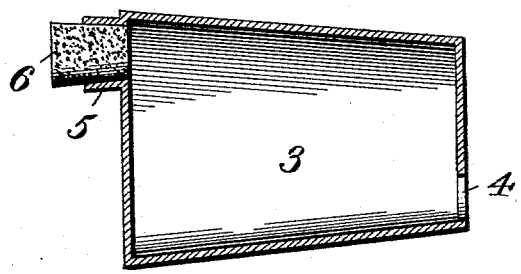

In the accompanying drawings, Figure 1 is a perspective view of an ice-cream freezer constructed in accordance with this invention. Fig. 2 is a central vertical sectional view thereof. Fig. 3 is a detail in perspective view of the stationary cross-bar and the several attachments thereof. Fig. 4 is an enlarged detail sectional view of the trap drain-tube for the ice tub or bucket.

Referring to the accompanying drawings, 1 designates an ice tub or bucket constructed in any suitable manner and in the usual shape to hold the ice which surrounds the rotating cylinder that carries the cream in the ordinary manner, and said ice tub or bucket 1 is provided in one side, at the bottom thereof, with the bottom drain-opening 2, in which is fitted the inner end of the conical cork-shaped trap drain-tube 3, that provides for the ready escape or draining of the water which would otherwise collect in the bottom of the tub, while at the same time preventing the air from entering therethrough into the bottom of the tub, and thereby raising the temperature therein. The said conical trap drain-tube is preferably closed at both ends and is provided in its inner closed end with a bottom water-inlet opening 4, located below the center of the tube at the lower side thereof, and in its outer closed end the said tube is provided with the top outlet-neck 5, disposed above the center of the tube at the upper side thereof, and it will therefore be seen that this arrangement of inlet and outlet or discharge openings provides means for allowing the water which accumulates inside of the bottom of the tub to readily flow into the tube through the opening 4 and out of the same through the outlet 5, and at the same time absolutely prevents the outside air from passing into the tub through the tube. With the drain-tube 3 uncorked the ice tub or bucket will always be kept relieved of accumulations of water therein; but if it is desired to hold the water in the tub a closure cork or plug 6 may be fitted in the upper or top outlet-neck 5 of the said tube, as clearly shown in the drawings.

Removably supported in a stationary position within the ice tub or bucket 1 is the stationary center post or shaft 7. The stationary center post 7 is provided with a lower threaded end 8, which projects through a central post-opening 9 in the bottom of the ice tub, and is engaged above and below said bottom by the clamp-nuts 10, which serve to securely and removably connect the said post to the bottom of the tub and hold the same supported in a vertical position at the center of the tub. The stationary center post 7 supports for rotation thereon the revolving freezing-cylinder 11, which is adapted to hold the cream or other substance to be frozen and is held in position on said center post between the upper of said clamp-nuts 10 and the washer 12, fitted on the center post directly above the bottom of the cylinder turning thereon.

The revolving freezing-cylinder 11 is open at its upper end and is adapted to be inclosed at such end by the removable cover-pan 13, fitted thereon. The removable cover-pan 13 is provided with a centrally dished or convexed bottom 14 and with a depending attaching flange 15, adapted to embrace the upper edges of the cylinder 11, and having diametrically-opposite bayonet-slots 16, adapted to engage the diametrically-opposite lock-studs 17, projected from opposite sides of the cylinder 11 at the upper end thereof, and this connection between the cover and the cylinder serves to securely lock the former to the latter and to hold the same stationary while the cylinder is being rotated, and the said cover-pan 13 has attached to one side thereof the handle-bracket 18, which is grasped by the hand of the operator for the purpose of rotating the cylinder 11 and freezing the cream or other substance contained therein. The said cover-pan 13 is adapted to be inclosed at the top by the flanged cover-lid 19, removably fitted thereto, and is adapted to hold a quantity of ice to assist in the freezing operation. The said cover-pan 13 therefore provides means for maintaining the upper end of the freezing-cylinder at a proper freezing temperature, and is further provided at one side with the drain-spout 20, communicating with the interior thereof and providing means for draining accumulations of water into the ice tub or bucket, from which such accumulations escape through the drain-tube 3. A conical pivot-step 21 is attached to the under side of the cover-pan 13 and is adapted to loosely turn on the pivot-stud 22, formed at the upper end of the stationary center post 7. To provide means for holding the cylinder perfectly steady during rotation and fitted centrally within the said freezing-cylinder and secured to the bottom thereof is an inner ice-cylinder 23. The inner ice-cylinder 23 is also adapted to hold a quantity of ice, and at the bottom thereof the freezing-cylinder 11 is provided with a series of drain openings or perforations 24, which allow the water to freely run into the bottom of the ice tub or bucket. The inner ice-cylinder 23 is of course rotated with the cylinder 11, but is somewhat shorter than the same, and at its upper open end the said inner ice-cylinder has fitted therein the flanged cap-plate 25, secured to the under side of the stationary cross-bar 26, and said cap-plate therefore not only serves to inclose the upper end of the ice-cylinder, but also forms a bearing-support therefor to maintain the same perfectly steady during rotation. The stationary cross-bar 26 extends beyond the sides of the cap-plate 25, attached thereto, and is provided with a central opening 27, fitting over the upper threaded portion 28 of the center post 7 below the upper pivot-stud 22 thereof, and clamp or jam nuts 29 engage the upper threaded portion 28 of said center post above and below the said cross-bar to securely fasten the same thereto; but other suitable fastening means may be substituted for those described to properly secure the said cross-bar in a stationary position on the upper end of the center post above the upper end of the inner ice-cylinder 23. Both ends of the stationary cross-bar 26 beyond the cap-plate 25 are longitudinally slotted, as at 30, and the slots at one end of the cross-bar receive the clamping-bolts 31, which engage the upper flanged ends 32 of the depending scraper-blades 33, which project into the space between the inner ice-cylinder and the freezing-cylinder to provide for scraping the frozen cream from the sides of said cylinders. The connection of the depending scraper-blades 33 with the cross-bar 26 provides for any adjustment of said scraper-blades that may be necessary, and, as illustrated, both of said scraper-blades are slightly twisted at an angle so as to dispose their scraping edges against the sides of the cylinders with which they contact.

The opposite slotted end of the stationary cross-bar 26 has adjustably attached thereto on the bolt 34 the upper flanged end 35 of the V-shaped mixer-bar 36, which also projects downwardly into the space between the inner ice-cylinder and the revolving freezing-cylinder diametrically opposite the scraper-blades 33. The said V-shaped mixer-bar 36 extends longitudinally at an angle from the cross-bar to which it is fastened in the same direction as the rotation of the freezing-cylinder, so that when the freezing-cylinder is revolved the said mixer-bar will stir up the cream, while at the same time preventing the same from rising toward the top of the cylinder, the disposition of said mixer-bar tending to force or direct the cream toward the bottom of the can, which is generally the coldest.

In revolving the freezing-cylinder 11 the inner ice-cylinder 23 is, of course, revolved therewith, and in order to hold the ice within said ice-cylinder stationary and to produce the necessary friction between the same and the said cylinder a vertical stationary abutment-plate 37 is arranged within the ice-cylinder at one side of the center post 7. The stationary abutment-plate 37 completely fills up the space between the inner ice-cylinder and the center post at one side of the latter and is provided at its upper and lower ends with the attaching-collars 38, that embrace the said center post near the upper and lower ends thereof, and the said stationary abutment-plate is prevented from rotation by the shoulder-pin 39, projected from the under side of the cross-bar and into the upper end of the ice-cylinder, so as to be disposed at one side of the upper end of said abutment-plate, so that the tendency of the ice within the ice-cylinder to move the plate 37 will be withstood by the stationary pin 39.

From the above it is thought that the construction, operation, and many advantages of the herein-described freezer will be readily apparent to those skilled in the art, and it will be understood that changes in the form, proportion, and the minor details of construction may be resorted to without departing from the principle or sacrificing any of the advantages of this invention.

Having thus described the invention, what is claimed, and desired to be secured by Letters Patent, is—

1. In a freezer, the combination of the ice-tub, a stationary center post secured at its lower end to the bottom of the tub, a revolving freezing cylinder mounted to rotate on said center post, an inner ice cylinder fitted within the freezing cylinder, a cap plate fitted on the center post and arranged in the upper open end of the ice cylinder, and a hollow ice-holding cover detachably locked to the upper open end of the freezing cylinder and having a pivotal connection with the upper extremity of the center post, said hollow ice-holding cover being provided with a handle, a convexed bottom and a side drain spout for discharging the drain water into the ice tub outside of the freezing cylinder, substantially as set forth.

2. In a freezer, the combination of the ice tub, a stationary center post secured at its lower end to the bottom of the tub and extended at its upper end into a pivot stud the freezing cylinder, and a hollow ice holding cover removably locked to the upper end of said freezing cylinder and provided on its under side with a pivot step loosely turning on the pivot stud of said center post, substantially as set forth.

3. In a freezer, the combination of the ice tub, a stationary center post arranged within said tub, a revolving freezing cylinder mounted to rotate on said center post, an inner ice cylinder fitted within said freezing cylinder, a stationary cross bar removably clamped onto the upper end of said center post above the freezing cylinder, a pair of depending scraper blades adjustably attached at their upper ends to one end of said cross bar and twisted at an angle to dispose their scraping edges against the sides of the freezing and ice cylinders between which the blades are arranged, a V-shaped mixer bar adjustably attached at its upper end to the opposite end of said cross bar and extended rearwardly at an angle therefrom in the direction of the rotation of the freezing cylinder, and a cap plate attached to the under side of said cross bar and loosely fitting in the upper end of said ice cylinder, substantially as set forth.

4. In a freezer, the ice tub, a stationary center post arranged within the tub, a revolving freezing cylinder mounted to rotate on said center post, an inner ice cylinder fitted within said freezing cylinder, a stationary vertical abutment plate arranged within said ice cylinder and connected to said center post, a stationary cross bar fitted onto the upper end of the center post above the ice cylinder and provided with a depending shoulder pin adapted to engage at one side of the upper end of said abutment plate, and the scrapers and mixer attached to opposite ends of said cross bar, substantially as set forth.

In testimony that I claim the foregoing as my own I have hereto affixed my signature in the presence of two witnesses.

ABRAHAM B. OPPY.

Witnesses:
J. W. SHERER,
R. T. ROSS.